United States Patent
Hsu et al.

(10) Patent No.: US 9,614,255 B2
(45) Date of Patent: Apr. 4, 2017

(54) ACID/ALKALINE HYBRID RESONANCE BATTERY DEVICE WITH DAMPING FUNCTION

(71) Applicants: Fu-Tzu Hsu, Taipei (TW); Chieh-Sen Tu, New Taipei (TW)

(72) Inventors: Fu-Tzu Hsu, Taipei (TW); Chieh-Sen Tu, New Taipei (TW)

(*) Notice: Subject to any disclaimer, the term of this patent is extended or adjusted under 35 U.S.C. 154(b) by 29 days.

(21) Appl. No.: 14/721,601

(22) Filed: May 26, 2015

(65) Prior Publication Data
US 2016/0351972 A1 Dec. 1, 2016

(51) Int. Cl.
*H01M 10/30* (2006.01)
*H01M 10/42* (2006.01)
*H01M 10/052* (2010.01)

(52) U.S. Cl.
CPC ..... *H01M 10/4207* (2013.01); *H01M 10/052* (2013.01); *H01M 10/30* (2013.01); *H01M 2010/4271* (2013.01)

(58) Field of Classification Search
CPC ............ C25B 9/04; C25B 1/06; H02J 7/0063; H01M 10/4207; H01M 2010/4271; H01M 10/052; H01M 10/30
See application file for complete search history.

(56) References Cited

U.S. PATENT DOCUMENTS

| | | | | |
|---|---|---|---|---|
| 6,198,250 B1* | 3/2001 | Gartstein | ............ | H01M 10/425 320/112 |
| 2010/0062347 A1* | 3/2010 | Li | ............ | H01M 6/10 429/344 |
| 2011/0295169 A1* | 12/2011 | Hendricks | ............ | A61F 5/028 602/19 |
| 2013/0141049 A1* | 6/2013 | Schaefer | ............ | H01M 10/425 320/127 |

* cited by examiner

*Primary Examiner* — Mark F Huff
*Assistant Examiner* — Monique Wills
(74) *Attorney, Agent, or Firm* — WPAT, PC; Justin King; Douglas Hosack

(57) ABSTRACT

An acid/alkaline hybrid resonance battery device with damping function is formed of a plurality of similar battery cells connected in either series or parallel. Every battery cell includes an acid rechargeable cell unit and an alkaline rechargeable cell unit, which are electrically connected in parallel. The acid rechargeable cell unit includes at least one acid rechargeable cell, and the alkaline rechargeable cell unit includes at least two serially connected alkaline rechargeable cells. The acid rechargeable cell unit has an electric potential and a capacity close to or equal to those of the alkaline rechargeable cell unit, so that a resonance damping effect is produced between the acid rechargeable cell unit and the alkaline rechargeable cell unit.

10 Claims, 5 Drawing Sheets

ACID/ALKALINE HYBRID RESONANCE BATTERY DEVICE WITH DAMPING FUNCTION

FIELD OF THE INVENTION

The present invention relates to an acid/alkaline hybrid resonance battery device with damping function, in which an acid rechargeable cell unit and an alkaline rechargeable cell unit are connected in parallel to form an individual battery cell of the battery device.

BACKGROUND OF THE INVENTION

A cell is a basic unit constituting a battery. According to the electrolyte used, rechargeable cells can be generally classified into two types, namely, acid battery and alkaline battery. The electrolyte for the acid battery can be a water solution of sulfuric acid. One example of such acid cell is a lead-acid battery. The lead-acid battery has some disadvantages, such as bulky, heavy, causing pollution and slow redox reaction, and therefore has been replaced by lithium iron phosphate battery. An acid secondary cell can store electrical energy in the form of electric current, and will become damaged when the stored electric current (I) is fully discharged (i.e. when I=0).

The electrolyte for an alkaline secondary cell is mainly a water solution of potassium hydroxide. Some examples of such alkaline rechargeable cell are alkaline zinc-manganese battery, nickel-cadmium battery and nickel-hydrogen battery. The alkaline rechargeable cell can store electrical energy in the form of voltage and will become damaged when it is discharged to have a voltage of zero, i.e. when V=0. Generally, a battery is dead and can no longer discharge when it is discharged to have a voltage lower than 1.0V. The alkaline rechargeable cell must be charged with very small electric current and usually requires more than 24 hours to be fully charged. Further, the alkaline secondary cell can be recharged several times only and is therefore inconvenient for use. Moreover, the alkaline rechargeable cell tends to have a rising temperature when it is being charged and discharged.

All the electrical appliances that use secondary cells as a power source are internally provided with a battery management system (BMS). Normally, the battery management system has the function of measuring battery voltage to prevent or avoid battery over-discharge, over-charge, over-heat, and other abnormal conditions. For an electrical device that uses multiple parallelly connected rechargeable cells as its power supply, the electrical device will stop supplying power when the battery management system thereof detects any one of the rechargeable cells has an insufficient voltage. Most consumers do not understand why the battery having electrical energy stored therein just could not discharge to even cause crash of the load. The sudden crash of the load tends to cause danger, particularly when a motor vehicle suddenly loses its power supply during moving.

SUMMARY OF THE INVENTION

A primary object of the present invention is to provide an acid/alkaline hybrid resonance battery device with damping function, which is formed of a plurality of similar battery cells connected in either series or parallel, and every battery cell internally produces a self-resonance damping effect to enable fast charge and fast discharge of the battery device.

Another object of the present invention is to provide an acid/alkaline hybrid resonance battery device with damping function, which enables automatic balance of internal potential and accordingly, does not require any battery management system (BMS).

To achieve the above and other objects, the acid/alkaline hybrid resonance battery device with damping function provided according to the present invention is formed of a plurality of similar battery cells connected in either series or parallel. Every battery cell includes an acid rechargeable cell unit and an alkaline rechargeable cell unit. Due to the resonance damping effect between the acid rechargeable cell unit and the alkaline rechargeable cell unit, a balanced electric potential between them can be automatically achieved to facilitate fast charge and fast discharge of the battery device.

The acid secondary cell unit and the alkaline rechargeable cell unit are electrically connected in parallel. The acid rechargeable cell unit includes at least one acid rechargeable cell, and the alkaline rechargeable cell unit includes at least two serially connected alkaline rechargeable cells. The acid rechargeable cell unit has an electric potential and a capacity close to or equal to those of the alkaline rechargeable cell unit, so that a resonance damping effect is produced between the acid rechargeable cell unit and the alkaline rechargeable cell unit.

The acid secondary cell can be a lithium iron phosphate (LFP) acid rechargeable cell; and the alkaline rechargeable cell can be a nickel-zinc alkaline rechargeable cell.

In the case of having more than one acid rechargeable cell in the acid rechargeable cell unit, the acid rechargeable cells can be connected in parallel to give the acid rechargeable cell unit an increased capacity. The alkaline rechargeable cells in the alkaline rechargeable cell unit can be connected in series to give the latter an increased capacity.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
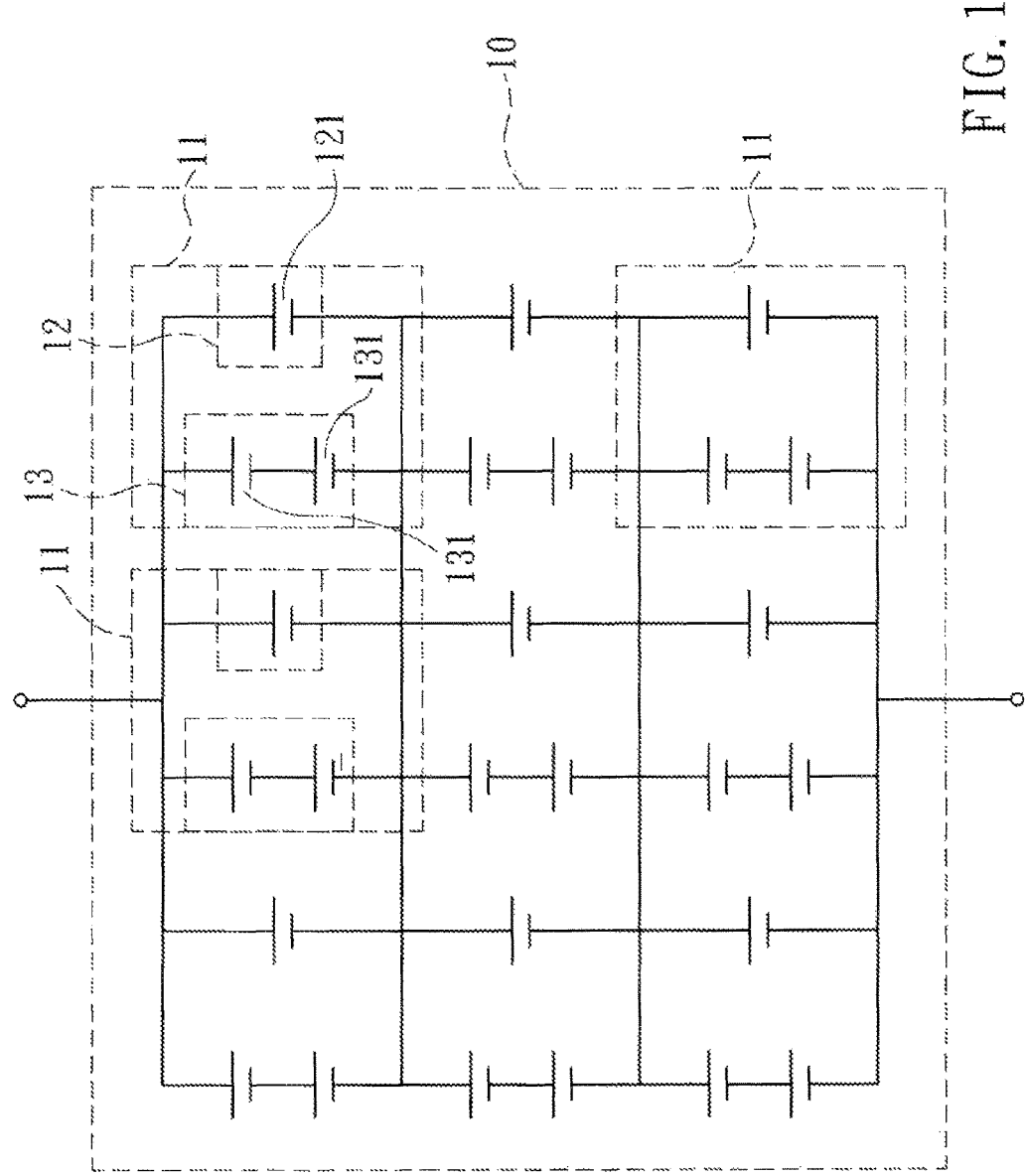
FIG. 1 shows the structure of an acid/alkaline hybrid resonance battery device with damping function according to a first embodiment of the present invention.
Figure 2:
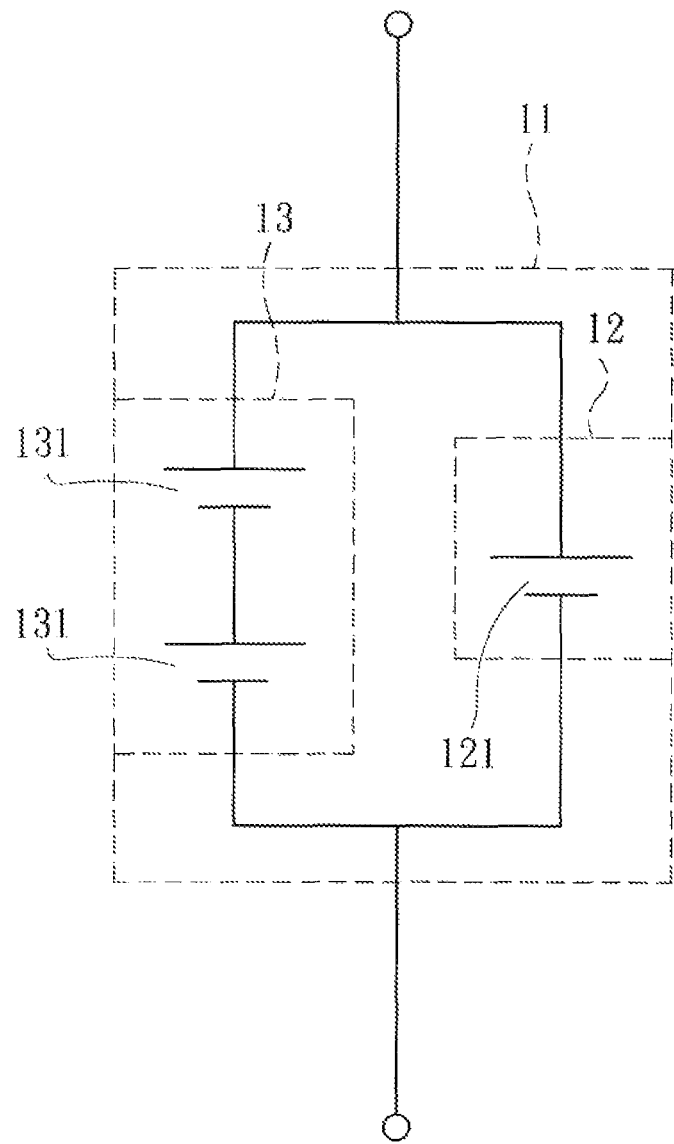
FIG. 2 shows the structure of one of many battery cells forming the battery device of FIG. 1.

Please refer to FIGS. 1 and 2, in which the structure of an acid/alkaline hybrid resonance battery device with damping function according to a first embodiment of the present invention is shown. For the purpose of conciseness and clarity, the present invention is also briefly referred to as the battery device and generally denoted by reference numeral 10 herein. As shown, the battery device 10 in the first embodiment is formed of a plurality of similar battery cells 11 connected in either series or parallel. Every battery cell 11 includes an acid rechargeable cell unit 12 and an alkaline rechargeable cell unit 13, which are electrically connected in parallel.

In the illustrated first embodiment, the acid rechargeable cell unit 12 consists of one acid rechargeable cell 121, and the alkaline rechargeable cell unit 13 consists of two alkaline rechargeable cells 131 that are connected in series. The acid rechargeable cell unit 12 and the alkaline rechargeable cell unit 13 are electrically connected in parallel. The acid rechargeable cell unit 12 has an electric potential close or equal to that of the alkaline rechargeable cell unit 13. More specifically, the acid rechargeable cell unit 12 preferably has an electric potential that is about from 90 to 110% of the electric potential of the alkaline rechargeable cell unit 13. A best battery performance can be achieved when the acid rechargeable cell unit 12 has an electric potential equal to that of the alkaline rechargeable cell unit 13. Generally, a commercially available acid rechargeable cell 121 has an electric potential from 3.2 to 3.6V, and a commercially available alkaline rechargeable cell 131 has an electric potential about 1.6V to 1.8V. So far, there has not yet been any battery device 10, of which the acid rechargeable cell unit 12 and the alkaline rechargeable cell unit 13 can have equal electric potential.

The acid rechargeable cell 121 and the alkaline rechargeable cell 131 are made of different material and accordingly, have different energy levels. Basically, the acid rechargeable cell unit 12 is suitable for storing electrical energy in the form of electric current, while the alkaline rechargeable cell unit 13 is suitable for storing electrical energy in the form of voltage.

The acid rechargeable cell unit 12 has a capacity close or equal to that of the alkaline rechargeable cell unit 13. More specifically, the acid rechargeable cell unit 12 preferably has a capacity that is about from 90 to 110% of the capacity of the alkaline rechargeable cell unit 13. A best battery performance can be achieved when the acid rechargeable cell unit 12 has a capacity equal to that of the alkaline rechargeable cell unit 13. However, since the true capacity of the second cell 121, 131 is the work (W) the cell can accommodate, that is, Work (W)=voltage (V)×current (I)×time (T), it is uneasy for the acid rechargeable cell unit 12 to have a real work capacity equal to that of the alkaline rechargeable cell unit 13.

Since the acid rechargeable cell unit 12 and the alkaline rechargeable cell unit 13 are different in their energy levels, and since a completely balanced electric potential between the acid rechargeable cell unit 12 and the alkaline rechargeable cell unit 13 must be achieved, an instantaneous voltage imbalance, i.e. a somewhat large voltage difference, between the acid rechargeable cell unit 12 and the alkaline rechargeable cell unit 13 occurred during the charge and the discharge process of the battery cell 11 would cause the alkaline rechargeable cell unit 13 having a higher instantaneous electric potential to automatically transfer the stored electrical energy to the acid rechargeable cell unit 12 that has a lower electric potential relative to the alkaline rechargeable cell unit 13, or cause the acid rechargeable cell unit 12 having a higher instantaneous electric potential to automatically transfer the stored electrical energy to the alkaline rechargeable cell unit 13 that has a lower electric potential relative to the acid rechargeable cell unit 12, so that the electric potential of the acid rechargeable cell unit 12 and of the alkaline rechargeable cell unit 13 gradually become the same and balanced. This automatic internal self-resonance condition produces a damping effect. Even when the battery cell 11 is not in the charge and discharge process, the internal self-resonance of the battery cell 11 still exists to produce the damping effect, bringing the electric potential of the acid rechargeable cell unit 12 and of the alkaline rechargeable cell unit 13 to become equal or close to each other and finally into a balanced state.

In the first embodiment illustrated in FIGS. 1 and 2, the acid rechargeable cell unit 12 consists of one 3.2~3.6V acid rechargeable cell 121 and the alkaline rechargeable cell unit 13 consists of two serially connected 1.6~1.8V alkaline rechargeable cells 131. That is, the acid rechargeable cell 121 has an electric potential of 3.2~3.6V that is close to a total electric potential of 3.2~3.6V of the two alkaline rechargeable cells 131. Therefore, the electric potential of the acid rechargeable cell unit 12 is about 90 to 110% of the electric potential of the alkaline rechargeable cell unit 13. In addition, the acid rechargeable cell 121 has a capacity of 20 Ah, while the alkaline rechargeable cells 131 respectively have a capacity of 20 Ah. Therefore, the capacity of the acid rechargeable cell unit 12 is within the range of from 90 to 110% of the capacity of the alkaline rechargeable cell unit 13. Thus, the acid rechargeable cell unit 12 can have a real work capacity close to that of the alkaline rechargeable cell unit 13.

The aforesaid acid rechargeable cell 121 can be a lithium iron phosphate (LFP) acid rechargeable cell; and the aforesaid alkaline rechargeable cell 131 can be a nickel-zinc alkaline rechargeable cell.

Figure 3:
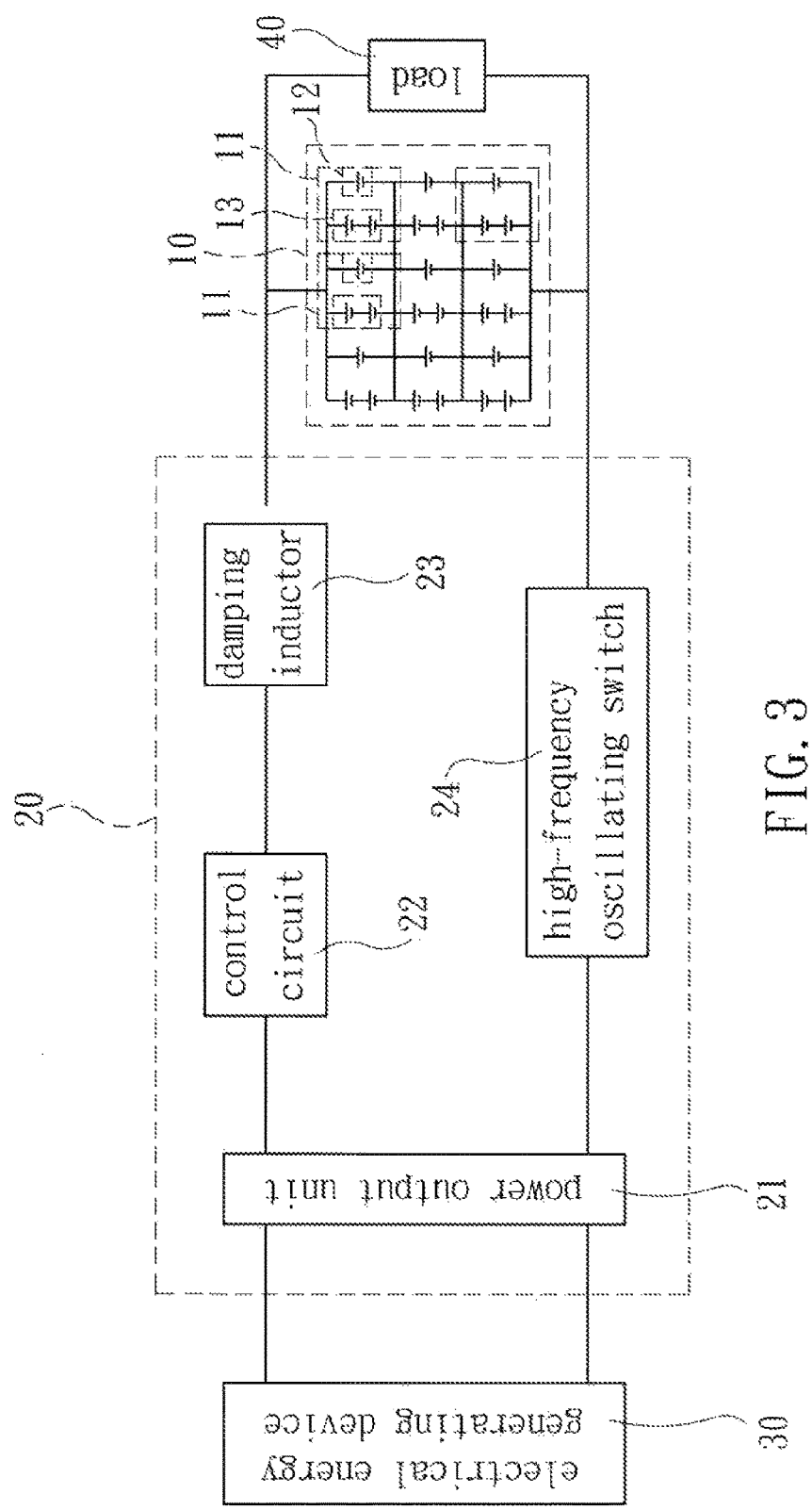
FIG. 3 is a block diagram showing the present invention is charged with a damping charging device.

The acid/alkaline hybrid resonance battery device with damping function 10 according to the present invention must be charged with a charging device having damping function, such as the damping charging device disclosed in Taiwan New Utility Model Patent No. M484854. Please refer to FIG. 3. The charging device 20 includes a power output unit 21, a control circuit 22, a damping inductor 23, and a high-frequency oscillating switch 24. The power output unit 21 is connectable to an electrical energy generating device 30 and is used to increase or decrease a voltage of the electrical energy output by the electrical energy generating device 30 and then outputs a voltage-regulated electrical power. The acid/alkaline hybrid resonance battery device 10 is connected at a positive terminal to the damping inductor 23 and at a negative terminal to the high-frequency oscillating switch 24. The electrical energy generating device 30 can be a renewable energy generator or a grid power source. When the high-frequency oscillating switch 24 of the charging device 20 is actuated, the damping inductor 23 is caused to store and release electrical energy alternately at high frequency. When the high-frequency oscillating switch 24 is ON, the damping inductor 23 is caused to store electrical energy. On the other hand, when the high-frequency oscillating switch 24 is OFF, the damping inductor 23 is caused to release the stored electrical energy to charge the acid/alkaline hybrid resonance battery device 10. Therefore, the electrical energy released from the damping inductor 23 to charge the battery device 10 is electrical energy with frequency response. And, the battery device 10 can discharge to a load 40 for the same to work.

The acid rechargeable cell unit 12 and the alkaline rechargeable cell unit 13 get voltage balance between them through instantaneous high-frequency resonance, which is a damping effect. Since every battery cell 11 in the battery device 10 will generate self-resonance during the charge and the discharge process without causing a rising temperature thereof, the battery device 10 can have a prolonged service life. Since the electric potential of the acid rechargeable cell unit 12 and of the alkaline rechargeable cell unit 13 automatically get equal or close to each other and into a balanced state, it is no longer necessary to use a battery management system (BMS). As a result, an electrical appliance does not require a BMS circuit board to thereby have lowered manufacturing cost and reduced overall weight.

Since every battery cell 11 of the battery device 10 has the damping property of self-resonance, more charge and discharge paths can be provided in the battery device 10 to enable even fast charge and discharge when more battery cells 11 are provided in the battery device 10.

Figure 4:
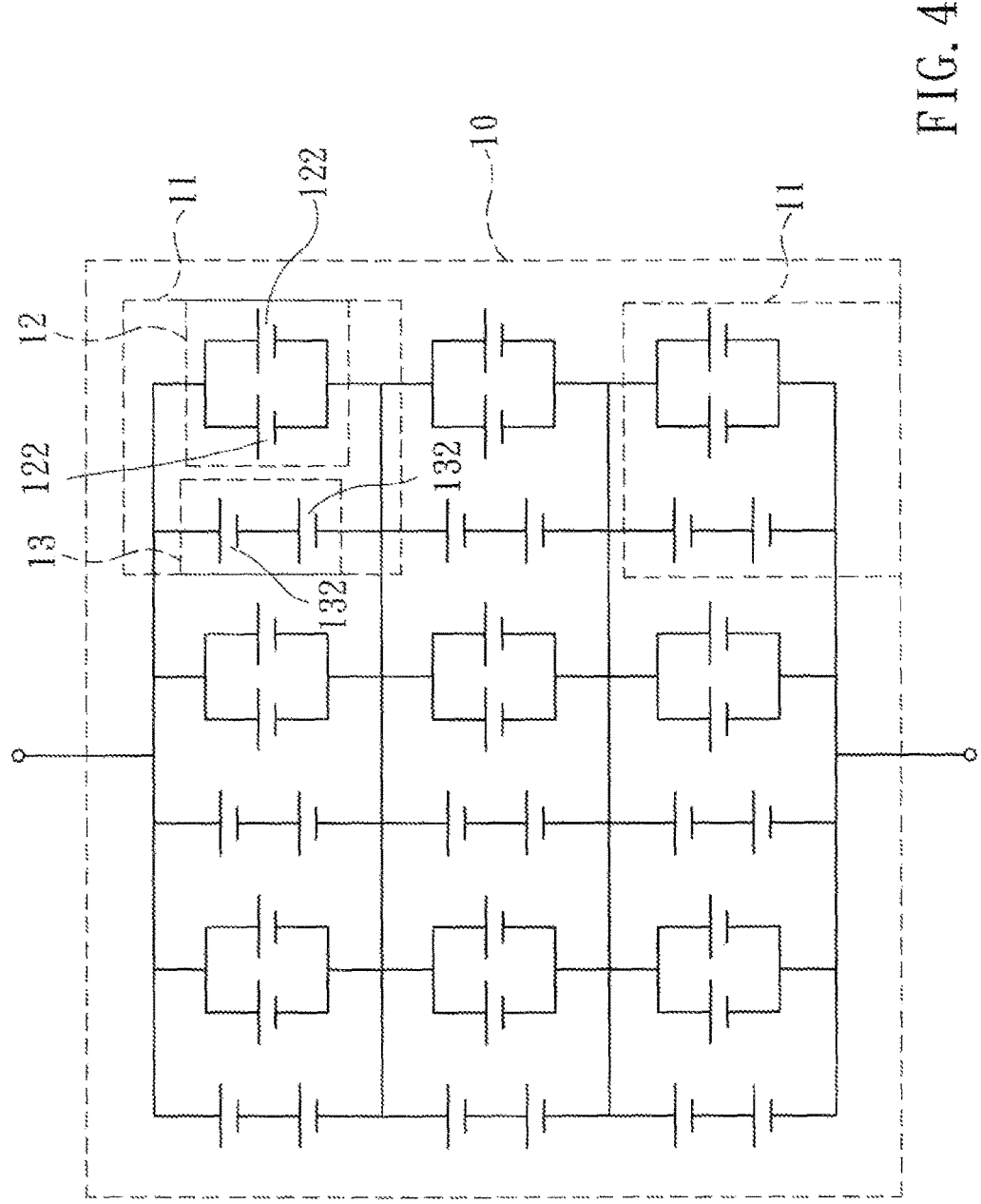
FIG. 4 shows the structure of an acid/alkaline hybrid resonance battery device with damping function according to a second embodiment of the present invention.
Figure 5:
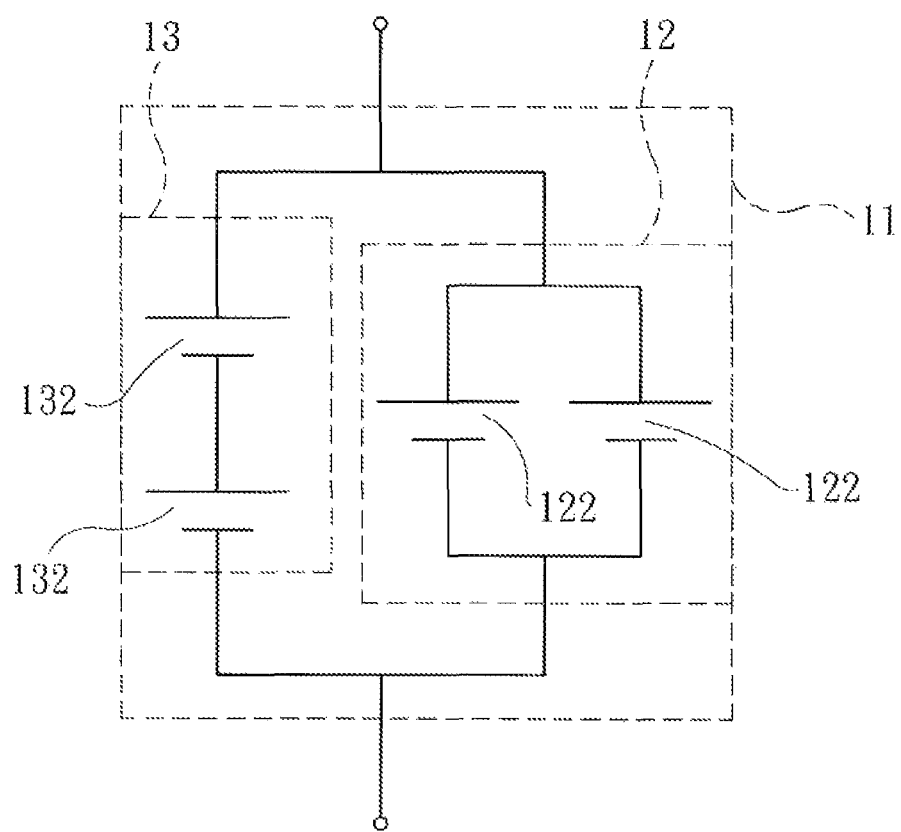
FIG. 5 shows the structure of one of many battery cells forming the battery device of FIG. 4.

FIGS. 4 and 5 show a battery device 10 according to a second embodiment of the present invention. In the second embodiment, the acid rechargeable cell unit 12 in every battery cell 11 of the battery device 10 consists of two parallelly connected 3.2~3.6V acid rechargeable cells 122, while the alkaline rechargeable cell unit 13 consists of two serially connected 1.6~1.8V alkaline rechargeable cells 132. Accordingly, the electric potential of the acid rechargeable cell unit 12 is from 90 to 110% of that of the alkaline rechargeable cell unit 13. Further, every acid rechargeable cell 122 has a capacity of 1250 mAh while the alkaline rechargeable cell 132 has a capacity of 2500 mAh. That is, the capacity of the acid rechargeable cell 122 is one half of that of the alkaline rechargeable cell 132. In other words, the capacity of the acid rechargeable cell 122 is about 45~55% of that of the alkaline rechargeable cell 132. Accordingly, the acid rechargeable cell unit 12 has a total capacity of 2500 mAh (i.e. 1250 mAh×2=2500 mAh), which is within the range from 90 to 110% of the total capacity of the alkaline rechargeable cell unit 13. Thus, two acid rechargeable cells 122 can be connected in parallel to increase the capacity of the acid rechargeable cell unit 12 to a level close to that of the alkaline rechargeable cell unit 13.

In summary, due to the resonance damping effect between the acid rechargeable cell unit 12 and the alkaline rechargeable cell unit 13, the battery device 10 provided according to the present invention has the following properties:

(1) An electric potential balance between the acid rechargeable cell unit 12 and the alkaline rechargeable cell unit 13 can be automatically achieved without the need of providing any battery management system (BMS).

(2) The internal resistance between the acid rechargeable cell unit 12 and the alkaline rechargeable cell unit 13 is low, which does not cause a rising temperature of the battery device 10 to ensure stable operation of the battery device 10.

(3) The number of the serially or parallelly connected battery cells 11 in the battery device 10 can be increased to not only enable increased voltage for energy storage and increased electric current for discharge, but also provide increased charge and discharge paths to enable even fast charge and discharge of the battery device 10.

The present invention has been described with some preferred embodiments thereof and it is understood that many changes and modifications in the described embodiments can be carried out without departing from the scope and the spirit of the invention that is intended to be limited only by the appended claims.

What is claimed is:

1. An acid/alkaline hybrid resonance battery device with damping function, comprising a plurality of similar battery cells connected in either series or parallel; every battery cell including an acid rechargeable cell unit and an alkaline rechargeable cell unit, which are electrically connected in parallel; the acid rechargeable cell unit including at least one acid rechargeable cell, and the alkaline rechargeable cell unit including at least one alkaline rechargeable cell; in the case there being more than one alkaline rechargeable cell in the alkaline rechargeable cell unit, the alkaline rechargeable cells being connected in series; the acid rechargeable cell unit having an electric potential that is about 90 to 110% of that of the alkaline rechargeable cell unit, and the acid rechargeable cell unit having a capacity that is about 90 to 110% of that of the alkaline secondary cell unit; wherein the acid/alkaline hybrid resonance battery device is configured to produce a resonance damping effect as the acid rechargeable cell unit and the alkaline rechargeable cell unit automatically maintain an electric potential balance between them.

2. The acid/alkaline hybrid resonance battery device with damping function as claimed in claim 1, wherein the acid rechargeable cell is a lithium iron phosphate (LFP) acid rechargeable cell.

3. The acid/alkaline hybrid resonance battery device with damping function as claimed in claim 1, wherein the alkaline rechargeable cell is a nickel-zinc alkaline rechargeable cell.

4. The acid/alkaline hybrid resonance battery device with damping function as claimed in claim 1, wherein the acid rechargeable cell unit consists of one 3.2~3.6V acid rechargeable cell, the alkaline rechargeable cell unit consists of two 1.6~1.8V alkaline rechargeable cells, and the acid rechargeable cell has a capacity that is about 90 to 110% of that of the alkaline rechargeable cell.

5. The acid/alkaline hybrid resonance battery device with damping function as claimed in claim 1, wherein the acid rechargeable cell unit consists of two parallelly connected 3.2~3.6V acid rechargeable cells, the alkaline rechargeable cell unit consists of two serially connected 1.6~1.8V alkaline rechargeable cells, and the acid rechargeable cell has a capacity that is about 45 to 55% of that of the alkaline rechargeable cell.

6. An acid/alkaline hybrid resonance battery device with damping function, comprising an acid rechargeable cell unit and an alkaline rechargeable cell unit, which are electrically connected in parallel; the acid rechargeable cell unit including at least one acid rechargeable cell, and the alkaline rechargeable cell unit including at least one alkaline rechargeable cell; in the case there being more than one alkaline rechargeable cell in the alkaline rechargeable cell unit, the alkaline rechargeable cells being connected in series; the acid rechargeable cell unit having an electric potential that is about 90 to 110% of that of the alkaline rechargeable cell unit, and the acid rechargeable cell unit having a capacity that is about 90 to 110% of that of the alkaline rechargeable cell unit; wherein the acid/alkaline hybrid resonance battery device is configured to produce a resonance damping effect as the acid rechargeable cell unit and the alkaline rechargeable cell unit automatically maintain an electric potential balance between them.

7. The acid/alkaline hybrid resonance battery device with damping function as claimed in claim 6, wherein the acid rechargeable cell is a lithium iron phosphate (LFP) acid rechargeable cell.

8. The acid/alkaline hybrid resonance battery device with damping function as claimed in claim 6, wherein the alkaline rechargeable cell is a nickel-zinc alkaline rechargeable cell.

9. The acid/alkaline hybrid resonance battery device with damping function as claimed in claim 6, wherein the acid rechargeable cell unit consists of one 3.2~3.6V acid rechargeable cell, the alkaline rechargeable cell unit consists of two 1.6~1.8V alkaline rechargeable cells, and the acid rechargeable cell has a capacity that is about 90 to 110% of that of the alkaline rechargeable cell.

10. The acid/alkaline hybrid resonance battery device with damping function as claimed in claim 6, wherein the acid rechargeable cell unit consists of two parallelly connected 3.2~3.6V acid rechargeable cells, the alkaline rechargeable cell unit consists of two serially connected 1.6~1.8V alkaline rechargeable cells, and the acid rechargeable cell has a capacity that is about 45 to 55% of that of the alkaline rechargeable cell.

\* \* \* \* \*